United States Patent [19]

Juzu et al.

[11] 4,162,348

[45] Jul. 24, 1979

[54] COLORING OF INORGANIC SUBSTRATES AND MINERAL MATERIALS

[75] Inventors: Shigeru Juzu; Hiroyuki Okazaki, both of Toyonaka; Yasuyuki Suzuki, Ibaraki, all of Japan

[73] Assignee: Sumitomo Chemical Company, Limited, Osaka, Japan

[21] Appl. No.: 653,163

[22] Filed: Jan. 28, 1976

Related U.S. Application Data

[63] Continuation of Ser. No. 457,303, Apr. 2, 1974, abandoned.

[30] Foreign Application Priority Data

Apr. 2, 1973 [JP] Japan ................................ 48-38155

[51] Int. Cl.$^2$ ........................... B05B 5/00; D06L 3/12
[52] U.S. Cl. ..................................... 428/474; 427/158; 427/214; 427/218; 427/216; 427/221; 427/302; 427/327; 427/333; 427/342; 427/421; 427/430 B; 427/435
[58] Field of Search ................ 427/157, 333, 214, 216, 427/218, 221, 302, 327, 342, 421, 430 B, 435, 158; 428/474

[56] References Cited

U.S. PATENT DOCUMENTS

| | | | |
|---|---|---|---|
| 2,686,737 | 8/1954 | Caroselli et al. | 117/126 |
| 2,762,719 | 9/1956 | Kleiner et al. | 117/126 |
| 2,868,668 | 1/1959 | Caroselli et al. | 117/126 |
| 3,266,931 | 8/1966 | Zimmerman et al. | 117/126 |
| 3,304,195 | 2/1967 | Ackerman | 117/126 |
| 3,390,114 | 6/1968 | UHl et al. | 117/126 |
| 3,589,934 | 6/1971 | Schimmel | 117/126 |
| 3,647,735 | 3/1972 | Brodnyan | 117/126 |
| 3,772,870 | 11/1973 | Wong et al. | 117/126 |
| 3,930,074 | 12/1975 | Drelich et al. | 427/302 X |
| 4,012,542 | 3/1977 | Oswitch et al. | 427/302 |

FOREIGN PATENT DOCUMENTS

882067 11/1961 United Kingdom .

*Primary Examiner*—Bernard D. Pianalto
*Attorney, Agent, or Firm*—Sughrue, Rothwell, Mion, Zinn and Macpeak

[57] ABSTRACT

A method for coloring inorganic substrates such as glass beads, glass fibers, mineral wool, rock wool, mineral fiber boards and cloths, concrete molded materials, inorganic pigments and metallic powders, which comprises treating the inorganic substrate with (1) a cationic component comprising

- (a) a water soluble cationic resin or an aqueous solution of a water soluble cationic resin,
- (b) an aqueous solution of a water soluble cationic resin and a water soluble cationic dye, or
- (c) an aqueous dispersion of a water soluble cationic resin, a cationic dispersing agent plus a water insoluble dye or pigment and, optionally, a cationic water soluble dye; and with (2) an anionic component comprising

- (d) an aqueous solution of a water soluble anionic dye,
- (e) an anionic dispersing agent or an aqueous solution of an anionic dispersing agent,
- (f) an aqueous solution of an anionic dispersing agent and a water soluble anionic dye, or
- (g) an aqueous dispersion of an anionic dispersing agent plus a water insoluble dye or pigment and, optionally, an anionic water soluble dye with the order of treatment with the cationic component (1) and the anionic component (2) being optional and with at least one of the cationic component (1) or the anionic component (2) containing a dye, either water soluble or water insoluble, or pigment as a colorant.

20 Claims, No Drawings

COLORING OF INORGANIC SUBSTRATES AND MINERAL MATERIALS

This is a continuation, of application Ser. No. 457,303, filed Apr. 2, 1974, new abandoned.

BACKGROUND OF THE INVENTION

1. Field of the Invention

The present invention relates to a coloring method which comprises coating the surface of inorganic substrates, for example, inorganic beads such as glass beads, inorganic fibers such as glass fibers, rock wool and mineral wool, mineral fiber boards and cloths obtained from the fibers, concrete molded materials such as concrete bricks and concrete electric poles, inorganic pigments such as titanium dioxide, calcium carbonate and alumina white, and metallic powders such as aluminum powder, with pigments or dyestuffs using water-soluble cationic resins.

2. Description of the Prior Art

Various methods for coloring inorganic substrates, particularly glass fibers, have been proposed, for example a dyeing with dyestuffs or pigments on the fibers previously surface-treated with silane compounds as disclosed in British Pat. No. 1,035,778, chromium compounds or other metallic ions as disclosed in Japanese Patent Publication No. 49471/72, a coating on the glass fiber cloths with pigments incorporated in resinous binders, and a transfer printing on the cloths as disclosed in Japanese Patent Publication No. 23684/72. In addition, a method which comprises making hard boards from rock wool using a binder composition containing colorants as disclosed in Japanese Patent Publication No. 5387/61 has been proposed.

These methods, however, are very disadvantageous because they are complicated to carry out and it is difficult to obtain a brilliant shade. Furthermore, coloring of inorganic pigments and aluminum powders has been described only to a small extent in the technical and patent literature.

SUMMARY OF THE INVENTION

From the situation above mentioned, an object of the present invention is to provide a new method for coloring inorganic substrates including not only inorganic fibers, beads, cloths and mineral fiber boards but also inorganic pigments such as titanium dioxide and alumina white, and metallic powders, without the disadvantages above mentioned.

Thus, the present invention provides a method for coloring inorganic substrates, which comprises treating the inorganic sustrate with (1) a cationic component comprising (a) a water soluble cationic resin or an aqueous solution of a water soluble cationic resin, (b) an aqueous solution of a water soluble cationic resin and a water soluble cationic type, or (c) an aqueous dispersion of a water soluble cationic resin, a cationic dispersing agent plus a water insoluble dye or pigment and, optionally, a cationic water soluble dye; and with (2) an anionic component comprising (d) an aqueous solution of a water soluble anionic dye, (e) an anionic dispersing agent or an aquious solution of an anionic dispersing agent, (f) an aqueous solution of an anionic dispersing agent and a water soluble anionic dye, or (g) an aqueous dispersion of an anionic dispersing agent plus a water insoluble dye or pigment and, optionally, an anionic water soluble dye with the order of treatment with the cationic component (1) and the anionic component (2) being optional and with at least one of the cationic component (1) or the anionic component (2) containing a dye, either water soluble or water insoluble, or pigment as a colorant.

DETAILED DESCRIPTION OF THE INVENTION

In the present invention, the cationic component (1) and the anionic component (2) can be used in any order, and the coloring of inorganic substrates essentially requires only these two components. That is, the cationic component (1) comprises water-soluble cationic resins, the anionic componet (2) comprises anionic dyes or anionic dispersing agents, and the color component comprises pigments or dyes. As long as the coloring of inorganic substrates is not affected, the pigments or dyes can previously be dispersed in either the cationic component (1) or the anionic component (2), or in both the cationic component (1) and anionic component (2), and moreover the cationic component (1) and the anionic component (2) can each contain one or more of the substances compatible in ionic character.

According to the present invention, in order to promote coating by pigments and dyes (both of which are hereinafter referred to as colorants, for brevity), the water-soluble cationic resins can be used preferably in the form of an aqueous solution at a concentration of about 0.1 to 50%, preferably about 1 to 10%, by weight. Also to promote the coating, the anionic dispersing agents and anionic dyes can also be used preferably in the form of an aqueous solution or dispersion at a concentration of about 0.1 to 50%, preferably about 1 to 10%, by weight rather than in the commercially available form.

In the present invention, a factor which greatly affects the coating with the colorant is the type of water-soluble cationic resins used and the combination of the cationic resins employed with anionic dispersing agents and/or anionic dyes. The most efficient combinations for coloring are;

(A) a combination of an aqueous solution of one or more water-soluble cationic resins with an aqueous solution of one or more anionic dyes, (B) a combination of an aqueous solution of one or more water-soluble cationic resins with an aqueous dispersion of one or more pigments or water-insoluble dyes dispersed using one or more anionic dispersing agents, and (C) a combination of an aqueous solution of one or more water-soluble cationic resins with a mixture of an aqueous solution of one or more anionic dyes and an aqueous dispersion of one or more pigments or water-insoluble dyes dispersed using one or more anionic dispersing agents.

The order of addition of the components employed in this invention is not of great concern and generally any order of treatment can be used. However, the order of addition sometimes affects the color depth slightly depending upon the kind of inorganic substrates. For example, when the present process is applied to inorganic fibers such as mineral wool, rock wool and glass fibers and to glass beads, the most suitable order is to first apply the cationic component to the surface of the inorganic fibers.

The water-soluble cationic resins which can be used in this invention include polyamide-polyamine-epichlorohydrin resins, polyamine-epichlorohydrin resins (such as Sumirez Resin 680, trade name, produced by Sumitomo Chemical Co., Ltd.), polyamide-polyamine-polyester-polyether-epichlorohydrin resins, polyvinylamine-polyacrylamide-epichlorohydrin resins, polyethylene-imine polymers, derivatives thereof (such as Tydex 12, trade name, produced by Dow Chemical Co. and Epomine P-1000, trade name, produced by Nippon Shokubai Kagaku Kogyo Co., Ltd.), Mannich reaction product or Hoffmann degradation products of polyacrylamide (such as Sumifloc FC 50, trade name, produced by Sumitomo Chemical Co., Ltd.), polycondensates of a polyamine with formaldehyde, homopolymer of dialkylaminoethyl methacrylate or a quaternary compound of a copolymer (e.g., styrene-acrylamide, etc.) (such as Lufax, trade name, produced by Rohm & Haas Co.), polycondensates of aniline with formaldehyde, polyvinylpyrrolidone and polyvinylpyridine.

The most preferred resins are polyamide-polyamine-epichlorohydrin resins which are commercially available as Sumirez Resin 650 (a registered trademark of Sumitomo Chemical Co., Ltd.) and Rymen 557 (a registered trademark of Hercules Inc.), polyethyleneimine polymers such as Epomine P-1000 (a trademark of Nippon Shokubai Kagaku Kogyo Co., Ltd.). These resins are all soluble in water exhibiting a cationic character, and are of such a character that they are adsorbed on the surface of inorganic substrates. The essential characteristic of the cationic water-soluble resin is that the resin be water soluble and exhibit a cationic character. The resin can be soluble in any proportion in water and be suitable for use, and the resin exhibits a cationic character when it is dissolved in water. A suitable degree of polymerization can range from about 10 to about 10,000,000, preferably 100 to 100,000.

For example, in the polyamide-polyamine-epichlorohydrin resins, the degree of polymerization is preferably about 500 to 5,000, and in the Mannich compounds of polyacrylamide, the polymerization degree is about 10,000 to 100,000.

The anionic dispersing agents referred to herein and which can be employed include generally anionic surfactants such as salts of fatty acids such as the alkali metal and ammonium salts of fatty acids having about 8 to 20 carbon atoms such as palmitic acid, behenic acid, stearic acid, oleic acid, etc., salts of sulfates of higher alcohols such as the alkali metal and ammonium salts of the sulfates of higher alcohols having about 8 to 18 carbon atoms such as lauryl alcohol, stearyl alcohol, oleyl alcohol, etc., naphthalene sulfonate formaldehyde condensates and polyalkyleneoxy sulfates such as the alkali metal and ammonium salts of sulfates of the ethoxylates, propoxylates or mixed ethoxylates and propoxylates of higher alcohols having about 8 to 18 carbon atoms and containing from about 4 to about 50 ethenoxy ($CH_2CH_2O$) units, about 4 to about 50 propenoxy ($CH_2$—$CH_2$—$CH_2O$) units or about 4 to about 50 of a mixture of such units. Advantageous examples which can be used are naphthalene sulfonate formaldehyde condensates such as Demol N (trade name, a product of Kao Atlas Co., Ltd.) and Tamol N (trade name, a product of Rohm & Haas Co.).

The aforesaid other materials which can be optionally used include various nonionic or cationic dispersing agents for dispersing pigments or dyes in water or resins.

The nonionic dispersing agents referred to herein include generally nonionic surfactants such as polyoxyethylene alkyl ethers such as those having the general formula $RO(CH_2CH_2O)_nH$ wherein R is an aliphatic group having about 12 to 18 carbon atoms and n ranges from about 4 to about 20, or polyoxyethylene phenol ethers such as those having the general formula $R_1$—$C_6H_4$—O—$(CH_2CH_2O)_{n1}H$ wherein $R_1$ is an aliphatic group having 8 or 9 carbon atoms and $n_1$ ranges from about 8 to about 50, sorbitan partial fatty acid esters such as sorbitan monolaurate, sorbitan distearate or sorbitan trioleate, polyoxyethylene acyl esters such as those having the general formula $R_2CO_2(CH_2CH_2O)_{n2}H$ wherein $R_2$ is an aliphatic group having about 12 to 18 carbon atoms and $n_2$ ranges from about 4 to about 50, oxyethylene oxypropylene block polymers such as those having a molecular weight of about 1,000 to about 10,000, and fatty acid monoglycerides such as those of the general formula $R_3OCH_2$—$CH(OH)$—$CH_2OH$ where $R_3$ is an acyl group having about 8 to about 18 carbon atoms. Advantageous examples are polyoxyethylene alkyl ethers such as Emulgen 404 (trade name, a product of Kao Atlas).

The cationic dispersing agents referred to herein include generally surfactants such as alkylamine salts such as lauryl amine acetate, quarternary ammonium salts such as lauryl trimethyl ammonium chloride or stearyl trimethyl ammonium chloride and polyoxyethylene alkylamines such as those having the general formula

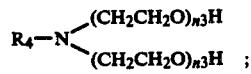

wherein $R_4$ is an alkyl group having about 8 to about 20 carbon atoms and $n_3$ ranges from about 3 to 20. Advantageous examples of such surfactants are quarternary ammonium salts such as Quartamin (trade name, a product of Kao Atlas).

These optional components can be present in either the anionic or cationic component providing ionic compatability exists.

As the colorant, anionic dyes, pigments and water-insoluble dyes are preferred, and cationic dyes can also be used, but are somewhat inferior to anionic dyes, water insoluble dyes and pigments in color depth.

The pigments referred to herein include both organic and inorganic pigments, for example, natural dyestuff pigments such as madder lake, nitroso pigments such as naphthol green B, nitro pigments such as naphthol yellow S, azo pigments such as lake red C, phthalocyanine pigments such as phthalocyanine blue, basic dyestuff pigments such as rhodamine lake, polycyclic condensation pigments such as quinacridone red, lithopone, titanium dioxide, zinc sulfide, chrome yellow, carbon black, red iron oxide and bronze powder.

The dyes referred to herein include direct dyes, acid dyes, basic dyes, reactive dyes, cationic dyes, vat dyes, disperse dyes, and fluorescent brightners. Of these, examples of water-soluble dyes include direct dyes, acid dyes, basic dyes, cationic dyes, reactive dyes and fluorescent brightners and examples of water-insoluble dyes include vat dyes, disperse dyes and some fluorescent brightners. Of the water-soluble dyes, those water soluble dyes which are anionic in character in aqueous solutions include direct dyes, reactive dyes, acid dyes and some fluorescent brightners (in the present invention, these dyes are referred to for brevity as anionic dyes). On the other hand, those water soluble dyes which are cationic in character in aqueous solutions include basic dyes, cationic dyes and some fluorescent brighteners. Similarly, for brevity, these dyes are referred to as cationic dyes in the present invention.

These dyes are shown in Color Index, 3rd Ed. published by the Society of Dyers and Colourists (England) and the American Association of Textile Chemists and Colorists (U.S.A.).

The inorganic substrates to which the present invention is applicable include inorganic beads such as glass beads; inorganic fibers such as mineral wool, rock wool and glass fibers; mineral fiber boards and cloths formed from the fibers; concrete molded materials such as concrete bricks and concrete electric poles, inorganic pigments such as titanium dioxide, alumina white, precipitated barium sulfate and precipitated calcium carbonate; and metallic powders such as aluminum powder.

The weight ratio of the cationic component to the anionic component which is used in the present invention is difficult to define with a great degree of particularity since the weight ratio will vary with a kind of substrate, degree of coloration and end-use application of the inorganic substrates to be colored. However, the weight ratio is approximately 10 to 90 to 90 to 10, preferably 30 to 70 to 70 to 30 of the cationic component to the anionic component. Usually, the amount of cationic component is about 0.01 to 10 wt%, preferably 0.1 to 3 wt% based on the weight of inorganic substrates, however this can be varied depending on the color depth desired. Since the ability of the surfactant to disperse pigments or dyes in water or resins is limited, pigments or dyes can not be added beyond a certain limit in a pigment or dye-anionic surfactant-water system, the surfactants must be added in amount of at least 20% by weight based on the weight of the pigment or water-insoluble dye.

A suitable treating time for the cationic component can range from about 1 minute to about 2 hours at a temperature of about 10° C. to about 100° C. and for the anionic component can range from about 1 minute to about 30 minutes at a temperature of about 10° C. to about 100° C. When the cationic component is used, the treating time and temperature are greatly influenced by the kind of inorganic substrates used. If an inorganic substrate having a large surface area per unit weight, such as an inorganic fiber, is employed, adsorption of the resin occurs comparatively easily so that the adsorption can be accomplished in about 1 to 10 minutes at 10° to 30° C. or for 1 to 5 minutes at 90° C. On the contrary, if an inorganic substrate having a small surface area per unit weight, such as glass beads, is employed, adsorption of the resin occurs with some difficulty so that adsorption is accomplished in about 1 to 2 hours at 10° to 30° C. Even with the greater adsorption difficulties described here, if the temperature is increased, easy adsorption of the resin occurs and the adsorption can be accomplished, for example, in about 5 to 15 minutes at a temperature of about 90° C.

On the other hand, when the anionic component is used, the treating time and temperature are not influenced to such an extent by the kind of inorganic substrate used. The adsorption can be accomplished in about 10 to 30 minutes at 10° to 30° C., or in about 1 to 10 minutes at 30° to 100° C., respectively.

The process of the present invention can be carried out as follows.

(1) Inorganic substrates are uniformly distributed in an aqueous medium by stirring and then the aforesaid cationic resin or its aqueous solution, or the cationic solution or dispersion is added thereto, and successively the anionic solution or dispersion is added thereto, the addition of both cationic and anionic components being carried out at ambient temperatures, (e.g., about 10° to 30° C.) or elevated temperatures (e.g., about 30° to 100° C.) while being stirred. This process is suitable for coloring of inorganic fibers, and powdery and granular inorganic substrates.

(2) Inorganic substrates are colored using spraying and dipping techniques generally used in the coating industry. For example, where a spraying technique is used, the inorganic substrates can be sprayed with the cationic components (preferably, a 1 to 10% by weight aqueous solution) and then allowed to stand for about 30 minutes to 1 hour (natural drying). The anion components (preferably, 1 to 10% by weight aqueous solution) are then sprayed and then treated for about 30 minutes to 6 hours at about 100° to 200° C. For example, where a dipping technique is used, the inorganic substrates can be dipped into the cationic components (preferably, a 1 to 10% by weight aqueous solution) and then allowed to stand for about 30 minutes to 1 hour (natural drying). The substrates are dipped into the anionic components (preferably, a 1 to 10% by weight aqueous solution) and then treated for about 30 minutes to 6 hours at about 100° to 200° C. These processes are suitable for coloring of formed inorganic substrates such as mineral fiber boards and cloths.

According to the present invention, while not desiring to be bound, it is believed that the coloring proceeds in such a way that water-soluble cationic resins are first adsorbed on the surface of inorganic substrates, and then anions of the anionic dispersing agent, or anions of the anionic dyes come into contact with the cations adsorbed on the substrate to form an ion pair, resulting in coloring of the inorganic substrates with the colorant. In this case, the colorant can be dispersed in an aqueous solution of either the anionic components or the cationic components.

According to the present invention, inorganic substrates can be colored in any shade with brilliancy. Furthermore, the method of the invention can also be applied to glass beads and inorganic pigments which are generally difficult to color, and the colored products obtained do not lose their color even when rubbed or dipped in water or in a mixed solvent with water such as a water/alcohol mixture, a water/ketone mixture or solvents such as aromatic solvents, e.g., toluene, xylene, esters such as ethyl acetate, etc. Microscopic observation of the inorganic substrates shows that the color components uniformly and completely cover the surface. In addition, when boards as an insulator are formed from mineral wool previously colored as demonstrated in the Examples, the colored boards have a higher hardness than that of uncolored boards, which means that unexpectedly the method of the invention imparts a reinforcing effect as well as a coloring effect.

The present invention will be illustrated in greater detail by reference to the following examples, which are only given for the purpose of illustration, and are not to be interpreted as limiting the scope of the invention. All parts in the examples are parts by weight.

EXAMPLE 1

Aqueous solutions and dispersions of the following compositions were prepared as follows.

(1) A Preparation of an aqueous pigment dispersion

Paste No. 1
| | |
|---|---|
| C.I. Pigment Green 7 | 10 parts |
| Demol N (Kao Atlas Co. Ltd.) | 5 parts |
| Water | 85 parts |

Paste No. 2
| | |
|---|---|
| C.I. Pigment Yellow 12 | 10 parts |
| Demol N (Kao Atlas Co. Ltd.) | 5 parts |
| Water | 85 parts |

Paste No. 3
| | |
|---|---|
| C.I. Pigment Red 53 | 10 parts |
| Demol N (Kao Atlas Co. Ltd.) | 5 parts |
| Water | 85 parts |

Paste No. 4
| | |
|---|---|
| C.I. Pigment Blue 15 | 10 parts |
| Emulgen 408 (Kao Atlas Co. Ltd.) | 3 parts |
| Sumirez Resin 650 (Sumitomo Chemical Co. Ltd.) | 4 parts (on a solids basis) |
| Water | 83 parts |

Paste No. 5
| | |
|---|---|
| C.I. Pigment Blue 15 | 10 parts |
| Demol N (Kao Atlas Co. Ltd.) | 5 parts |
| Emulgen 408 (Kao Atlas Co. Ltd.) | 1 parts |
| Water | 84 parts |

B) Preparation of an anionic dispersing agent aqueous solution

Paste No. 6
| | |
|---|---|
| Demol N (Kao Atlas Co. Ltd.) | 10 parts |
| Water | 90 parts |

C) Preparation of a water-soluble cationic resin aqueous solution

Paste No. 7
| | |
|---|---|
| Sumirez Resin 650 (Sumitomo Chemical Co. Ltd.) | 2 parts (solids basis) |
| Water | 98 parts |

Paste No. 8
| | |
|---|---|
| Epomine P-1000 (Nippon Shokubai Kagaku Kogyo Co. Ltd.) | 2 parts (solids basis) |
| Water | 98 parts |

Paste No. 9
| | |
|---|---|
| Mannich reaction product from polyacrylamide (molecular weight about 500,000; Mannich degree 80%) | 2 parts (solids basis) |
| Water | 98 parts |

D) Preparation of a dye aqueous dispersion

Paste No. 10
| | |
|---|---|
| C.I. Vat Yellow 10 | 10 parts |
| Demol N (Kao Atlas Co. Ltd.) | 5 parts |
| Water | 85 parts |

Paste No. 11
| | |
|---|---|
| C.I. Acid Orange 67 | 5 parts |
| Water | 95 parts |

Paste No. 12
| | |
|---|---|
| C.I. Basic Yellow 11 | 5 parts |
| Water | 95 parts |

Pastes No. 1 to 5 are aqueous dispersions of pigments, Paste No. 6 is an aqueous solution of an anionic dispersing agent, Pastes No. 7 to 9 are aqueous solutions of water-soluble cationic resins, and Pastes 10 to 12 are aqueous dispersions of dyes.

Note:

Demol N: trade name of Kao Atlas Co. Ltd. for an anionic surfactant, a naphthylene sulfonate-formaldehyde condensate, sodium salt Emulgen 408: trade name of Kao Atlas Co. Ltd. for a nonionic surfactant, a polyoxyethylene oleyl ether (HLB: 8.8)

Sumirez Resin 650: trade name of Sumitomo Chemical Co. Ltd. for a polyamidepolyamine-epichlorohydrin resin, 20% aqueous solution: viscosity 20 to 100 cps at 25° C.; degree of polymerization about 1000–2000

Epomine P-1000: trade name of Nippon Shokubai Kagaku Kogyo Co. Ltd. for a polyethyleneimine polymer, 30% by weight aqueous solution: viscosity of about 400 to 900 cps at 25° C.

(2) Coloring of Inorganic Fibers (1) 200 parts of rockwool (Matsushita Denko Co. Ltd., Authorization No. 1021 by the Japanese Government, Department of Construction) were placed in 9,800 parts of water and the fibrous material was separated and dispersed by a stirrer for about 5 minutes.

(2) To the water containing the suspended rockwool were added in order the pastes as shown in the Tables hereinafter in the prescribed proportion set forth in the Tables hereinafter, and the mixture was stirred for 5 minutes each time each paste was added.

(3) The rockwool was filtered off on a 50 mesh wirenet and dried for 2 days at room temperature (about 20° to 30° C.) or for 5 hours at 100° C.

The color depths of the rockwool and the filtrate were graded visually.

(A) Difference in color depth due to the difference between pigments and water-insoluble dyes Table 1

| Addition order | 1 | 2 | 3 | 4 |
|---|---|---|---|---|
| Paste No., amount used | No. 7 40 parts | No. 7 40 parts | No. 7 40 parts | No. 7 0 parts |
| Paste No., amount used | No. 1 20 parts | No. 2 20 parts | No. 3 20 parts | No. 10 20 parts |
| Pigment (C.I. Pigment No.) or Dye (C.I. Vat No.) | Green 7 | Yellow 12 | Red 53 | — — Yellow 10 |
| Color Depth of Filtrate | Almost colorless | Almost colorless | Almost colorless | Almost colorless |
| Color Depth of Rockwool | Control | Equal | Equal | Equal |
| Evaluation | Uniformly colored Good | Uniformly colored Good | Uniformly colored Good | Uniformly colored Good |

As can be seen from the results contained in Table 1, the difference in kind between pigments and water-insoluble dyes did not affect the color depth of rockwool.

From a microscopic observation of the colored rockwool, it was found that the rockwool was covered uniformly with the pigments and water-insoluble dyes. The rockwool did not lose its color even when dipped for 10 minutes in water or in a water-acetone mixture.

(B) Difference in color depth due to the kind of water-soluble cationic resin water-acetone (e.g., a 50:50 mixture by weight) mixture for 10 minutes.

(C) Difference in color depth in a system containing nonionic dispersing agent

Table 3

| | | Sample No. | | |
|---|---|---|---|---|
| | | 8 | 9 | 10 |
| Addition order | Paste No., amount used | No. 7 40 parts | No. 4 20 parts | No. 7 40 parts |
| | Paste No., amount used | Vo. 1 20 parts | No. 6 10 parts | No. 5 20 parts |
| Combination | | (Aqueous solution of water-soluble Cationic resin) + (Aqueous dispersion of pigment dispersed therein using an anionic dispersing agent) | (Aqueous solution of water-soluble cationic resin with pigment dispersed therein using a nonionic dispersing agent) + (Aqueous solution of anionic dispersing agent) | (Aqueous solution of water-soluble cationic resin) + (Aqueous dispersion of pigment dispersed therein using an anionic and a nonionic dispersing agent) |
| Color Depth of Filtrate | | Almost colorless | Slightly colored | Slightly colored |
| Color Depth of Rockwool | | Control Uniformly colored | Slightly lower Uniformly colored | Slightly lower Uniformly colored |
| Evaluation | | Good | Good | Good |

*The amount of pigments based on the rockwool used in Sample Nos. 8, 9 and 10 was the same.

Table 2

| | | Sample No. | | |
|---|---|---|---|---|
| | | 5 | 6 | 7 |
| Addition order | Paste No., amount used | No. 7 40 parts | No. 8 40 parts | No. 9 40 parts |
| | Paste No., amount used | No. 1 20 parts | No. 1 20 parts | No. 1 20 parts |
| Cation Type Water-Soluble Resin | | Sumirez Resin 650 | Epomine P-1000 | Mannich Reaction Product of Polyacrylamide |
| Color Depth of Filtrate | | Almost colorless | Almost colorless | Slightly colored |
| Color Depth of Rockwool | | Control Uniformly colored | Equal Uniformly colored | Slightly lower Uniformly colored |
| Evaluation | | Good | Good | Good |

As can be seen from the results in Table 2, the kind of water-soluble cationic resin affected the color depth of the rockwool to some extent. The resins most suitable for coloring were polyamidepolyamine-epichlorohydrin resins, polyamine-epichlorohydrin resins, polyamidepolyamine polyether polyester-epichlorohydrin resins, polyvinylamine polyacrylamide-epichlorohydrin resins and polyethyleneimine polymers.

A microscopic observation of the colored rockwool showed that the wool surface was uniformly covered with the pigments. In addition, the colored rockwool did not lose its color even when dipped in water or in a It can be seen the results in Table 3 that the color depths of the rockwool were slightly lower using the system containing nonionic dispersing agents than using the system containing no nonionic dispersing agents.

A microscopic observation of the colored rockwool showed that the wool surface was uniformly covered with pigments. In addition, the colored rockwool did not lose its color even when dipped in water or in a water-acetone mixture for 10 minutes.

(D) Difference in color depth due to the addition order of components

Table 4

| | | Sample No. | |
|---|---|---|---|
| | | 11 | 12 |
| Addition order | Paste No., amount used | No. 7 40 parts | No. 1 20 parts |
| | Paste No., amount used | No. 1 20 parts (a) Cation type water-soluble resin | No. 7 40 parts (a) Anionic dispersing agent (containing pigments) |
| Addition Order of (a) then (b) | | (b) Anionic dispersing agent (containing pigments) | (b) Cation type water soluble resin |
| Color Depth of Filtrate | | Almost colorless | Slightly colored |

Table 4-continued

| | Sample No. | |
|---|---|---|
| | 11 | 12 |
| Color Depth of Rockwool | Control | Slightly lower |
| Evaluation | Uniformly colored Good | Uniformly colored Good |

It can be seen from the results in Table 4 that the first addition of the water-soluble cationic resin to the rockwool was better.

A microcopic observation of the colored rockwool showed that the rockwool surface was uniformly covered with pigments. In addition, the colored rockwool did not lose its colore even when dipped in water or in a water-acetone mixture for 10 minutes.

(E) Hardness of formed boards **

Table 5

| | | Sample No. | |
|---|---|---|---|
| | | 13 | 14 |
| Addition order | Paste No., amount used | — | No. 7 40 parts |
| | Paste No., amount used | — | No. 1 20 parts |
| | Starch (solids) | 20 parts | 20 parts |
| Hardness of Formed Boards*** | | 40 | 60 |

Note:
**Preparation of mineral fiber boards: Boards (specific gravity 0.27 g/cm³, 1.5 cm thick) were prepared on a TAPPI standard sheet machine with drying at 170° C. for 45 minutes to 1 hour
***Hardness: Measured on a Spring type Hardness Tester C according to the test method of JIS K6301 5.2

As can be seen from the results in Table 5, the hardness of boards could be increased using the coloring method of the present invention.

(F) Difference in color depth due to the difference between dyes and pigments

Table 6

| | | Sample No. | | |
|---|---|---|---|---|
| | | 15 | 16 | 17 |
| Addition order | Paste No., amount used | No. 7 40 parts | No. 7 40 parts | No. 7 40 parts No. 12 30 parts mixture |
| | Paste No., amount used | No. 1 20 parts | No. 11 30 parts | No. 6 10 parts |
| Coloring Material Used | | Pigment | Anion type dyes | Cation type dyes |
| Color Depth of Filtrate | | Almost colorless | Almost colorless | Slightly colored |
| Color Depth of Rockwool | | Control Uniformly colored | Equal Uniformly colored | Inferior Uniformly colored |
| Evaluation | | Good | Good | Good |

As can be seen from the results in Table 6, no difference in color depth of rockwool was observed between the pigment and the anion type dye, however the color depth was lower with the cation type dye than with the other two coloring materials.

(3) Coloring of Mineral Fiber Boards

A commercially available mineral wool board (specific gravity 0.27 g/cm³, 1.5 cm thick) was colored as follows.

(1) The board was dipped for 10 to 20 minutes in a 5% aqueous solution (converted to a resin solids basis) of Sumirez Resin 650.

(2) Then, the board was dipped in Paste No. 1 for 10 to 20 minutes.

(3) The board was removed, washed with water mildly and then dried at room temperature, or at 100° C. for 5 hours.

The colored board thus obtained was very brilliant in shade, and did not lose its color even when rubbed on the surface thereof, or dipped in water or in a water-acetone mixture.

EXAMPLE 2

(1) Preparation of an Aqueous Suspension of Pigment

| Paste No. 13 | |
|---|---|
| C.I. Pigment Blue 15 | 20 parts |
| Demol N (Kao Atlas Co. Ltd.) | 8 parts |
| Water | 72 parts |
| Preparation of an Aqueous Solution of Cation Type Water-soluble Resin | |
| Paste No. 14 | |
| Sumirez Resin 650 (Sumitomo Chemical Co. Ltd.) | 5 parts (on a resin solids basis) |
| Water | 95 parts |

(2) Coloring of Glass Fibers 100 parts of glass fibers (Micro Glass ES-13 produced by Nihon Glass Fiber Co. Ltd.) were placed in 900 parts of water, and the materials dispersed with a stirrer. To the water containing the suspended glass fiber were first added 20 parts of Paste No. 14, followed by stirring for 1 hour, then 12 parts of Paste No. 13 were added thereto, followed by stirring for 5 to 10 minutes. The fibers were filtered off on a 50 mesh wirenet, and then dried at 100° C. for 5 hours.

(3) From a microscopic observation of the colored glass fibers, it was found that the fibers were uniformly covered with the pigment. In addition, the colored fibers did not lose their color even when dipped in water or in a water-acetone mixture (e.g., 50/50 by weight) for a long period of time (e.g., 24 hours at room temperature).

EXAMPLE 3

The following are coloring examples of rutile type titanium dioxide (Tipaque R-820 produced by Ishihara Sangyo Co. Ltd.). The pastes used were the same as described in Example 2.

(1) 100 parts of rutile type titanium dioxide and 20 parts of Paste No. 14 were added to 500 parts of water, followed by stirring for 30 minutes. Then 12.5 parts of Paste No. 13 were added thereto and the mixture further stirred for 10 minutes. On standing, the colored product immediately settled to the bottom resulting in a clear and colorless supernatant. The product was filtered, washed with water and dried at 100° C. for 5 hours. The dried product was powdered in a mortar and passed through a 100 mesh wirenet.

(2) The colored product thus obtained was observed under a microscope, and it was found that the surface of the titanium white was uniformly covered with the pigment. The product did not lose its surface color even when dipped in solvents, for example, toluene, xylene, n-butanol and ethylacetate.

EXAMPLE 4

The following example illustrates the coloring of calcium carbonate. The pastes used were the same as described in Example 1. 200 parts of Calcium Carbonate NS-100 (Nitto Funka Co. Ltd.) and 40 parts of Paste No. 7 were added to 800 parts of water, and stirred for 5 minutes. Then 30 parts of Paste No. 11 were stirred therein, and then the mixture was further stirred for 5 minutes, filtered, washed with water and dried.

The dye on the colored product was not dissolved even when the product was dipped into solvents, and microscopic observation also showed that the surface of calcium carbonate was uniformly covered with the dye.

EXAMPLE 5

As the materials to be colored, extender pigments and metallic powders such as (1) Alumina AM-21 (Sumitomo Chemical Co. Ltd.), (2) precipitated barium sulfate (Nihon Kagaku Co., Ltd.), (3) precipitated calcium carbonate (Hakurenka CC produced by Shiraishi Kogyo Co. Ltd.) and (4) aluminum powder were each colored in the same manner as described in Example 3 to obtain colored products with the coloring matter attached firmly to the product.

While the invention has been described in detail and with reference to specific embodiments thereof, it will be apparent to one skilled in the art that various changes and modifications can be made therein withiut departing from the spirit and scope thereof.

What is claimed is:

1. A method for coloring an inorganic substrate, which comprises contacting the inorganic substrate in separate steps but in any order with (1) a cationic component comprising
   (a) a water soluble cationic resin or an aqueous solution of a water soluble cationic resin, said cationic resin comprising at least one of polyamide-polyamine-epichlorohydrin resins, polyamine-epichlorohydrin resins, polyvinylamine-polyacrylamide-epichlorohydrin resins and polyethyleneimine polymers,
   (b) an aqueous solution of said water soluble cationic resin and a water soluble cationic dye, or
   (c) an aqueous dispersion of said water soluble cationic resin, a cationic dispersing agent plus a water insoluble dye or pigment, and with (2) an anionic component comprising
   (d) an aqueous solution of a water soluble anionic dye,
   (e) an anionic dispersing agent or an aqueous solution of an anionic dispersing agent,
   (f) an aqueous solution of an anionic dispersing agent and a water soluble anionic dye, or
   (g) an aqueous dispersion of an anionic dispersing agent plus a water insoluble dye or pigment and with at least one of the cationic component (1) or the anionic component (2) containing a colorant comprising at least one of a pigment, a direct dye, an acid dye, a reactive dye, a vat dye, a disperse dye, and an anionic fluorescent brightner.

2. The method according to claim 1, wherein said cationic component (1) is an aqueous solution containing about 0.1 to 50% by weight of said cationic resin.

3. The method according to claim 1, wherein said anionic component (2) is an anionic solution or dispersion containing about 0.1 to 50% by weight of an anionic dye.

4. The method according to claim 1, wherein said inorganic substrate is an inorganic substrate in the form of beads, fibers, boards or cloths.

5. The method according to claim 1, wherein said anionic dispersing agent comprises at least one of a salt of a fatty acid, a sulfate of a higher alcohol, a naphthalene sulfonateformaldehyde condensate and a polyalkyleneoxyalcohol sulfate.

6. The method according to claim 1, wherein the weight ratio of said cationic resin in said cationic component (1) to the weight of said anionic dye or said anionic dispersing agent in said anionic component (2) is about 10 to 90 to 90 to 10.

7. The method according to claim 1, wherein the amount of said cationic resin is about 0.01 to 10% by weight based on the weight of said inorganic substrate.

8. The method according to claim 1, wherein the amount of said anionic dye or colorant in said anionic component (2) is about 0.01 to 10% by weight based on the weight of said inorganic substrate.

9. The method according to claim 1, wherein said contacting comprises distributing said inorganic substrate in an aqueous medium, adding said cationic component (1) to the inorganic substrate-containing aqueous medium while stirring, successively adding said anionic component (2) to the inorganic substrate-containing aqueous medium while stirring, and recovering said colored inorganic substrate.

10. The method according to claim 9, wherein said contacting is at a temperature ranging from about 10° C. to 100° C.

11. The method according to claim 1, wherein said contacting is carried out by spraying said substrate with or dipping said substrate in said cationic component (1) and said anionic component (2).

12. An inorganic substrate colored by the method of claim 1.

13. The method according to claim 1, wherein said cationic component (c) further contains a cationic water soluble dye.

14. The method according to claim 1, wherein said anionic component (g) further contains an anionic water soluble dye.

15. The method according to claim 1, wherein said inorganic substrate is an inorganic pigment or a metallic powder.

16. The method according to claim 1, wherein the inorganic substrate is glass beads, glass fibers, rock wool, mineral wool, mineral fiber boards, mineral fiber cloths, concrete molded materials, titanium dioxide, calcium carbonate, alumina white or aluminum powder.

17. The method according to claim 1, wherein said cationic resin is polyamide-polyamine-epichlorohydrin.

18. The method according to claim 1, wherein said cationic resin is polyvinylamide-polyacrylamide-epichlorohydrin.

19. The method according to claim 1, wherein said cationic resin is polyethyleneimine polymer.

20. The method according to claim 1, wherein the cationic component is (a), and the anionic component is a member selected from (d), (f) and (g).

* * * * *